(12) United States Patent
Joblin, Jr. et al.

(10) Patent No.: US 9,382,166 B1
(45) Date of Patent: Jul. 5, 2016

(54) PLANT NUTRIENT COMPOSITION

(71) Applicant: Magic Dirt LLC, Little Rock, AR (US)

(72) Inventors: Walter Robert Joblin, Jr., Little Rock, AR (US); Richard Theodore Sniegocki, Little Rock, AR (US)

(73) Assignee: Magic Dirt LLC, Little Rock, AR (US)

( * ) Notice: Subject to any disclaimer, the term of this patent is extended or adjusted under 35 U.S.C. 154(b) by 0 days.

(21) Appl. No.: 14/686,730

(22) Filed: Apr. 14, 2015

(51) Int. Cl.
*C05F 3/00* (2006.01)
*C05F 11/00* (2006.01)
*C05G 3/04* (2006.01)
*C05B 17/00* (2006.01)
*C09K 17/52* (2006.01)

(52) U.S. Cl.
CPC . *C05G 3/04* (2013.01); *C05B 17/00* (2013.01); *C05F 3/00* (2013.01); *C05F 11/00* (2013.01); *C09K 17/52* (2013.01)

(58) Field of Classification Search
None
See application file for complete search history.

(56) References Cited

U.S. PATENT DOCUMENTS

| | | | | |
|---|---|---|---|---|
| 4,900,348 A * | 2/1990 | Hoitink | .................. | A01N 63/00 435/252.1 |
| 6,012,251 A * | 1/2000 | Siegert | .................... | C05F 11/00 47/59 R |
| 6,071,984 A * | 6/2000 | Grigat | ..................... | C05F 11/00 523/124 |
| 8,083,829 B2 * | 12/2011 | Correa Delgado | ....... | C05D 3/02 71/11 |
| 8,771,980 B2 * | 7/2014 | Li | .............. | C02F 3/28 435/183 |
| 2007/0141691 A1 * | 6/2007 | Hirl | ......... | C05F 5/008 435/161 |
| 2008/0280760 A1 * | 11/2008 | Oliver | ..................... | C05F 11/00 504/101 |
| 2011/0094154 A1 * | 4/2011 | Joaquin | .................. | A01G 1/046 47/65.8 |
| 2012/0096767 A1 * | 4/2012 | Shpak | ................... | A01G 9/1086 47/59 S |
| 2012/0231171 A1 * | 9/2012 | Roa-Espinosa | ........... | C05B 7/00 427/385.5 |
| 2013/0055635 A1 * | 3/2013 | Harman | ............... | A01G 31/001 47/58.1 R |
| 2014/0033776 A1 * | 2/2014 | Josse | ......................... | C02F 1/20 71/10 |
| 2015/0203414 A1 * | 7/2015 | Cook | ....................... | C05D 9/00 71/7 |
| 2015/0225305 A1 * | 8/2015 | Donze | ..................... | C05F 11/00 71/23 |
| 2015/0232391 A1 * | 8/2015 | Ioroi | ....................... | C05F 11/00 71/23 |

* cited by examiner

*Primary Examiner* — Wayne Langel
(74) *Attorney, Agent, or Firm* — Joe D. Calhoun

(57) ABSTRACT

A plant nutrition composition including long organic fibers having nitrogen, phosphorus and potassium available for plants, in combination with organic substratum providing pH balancing in the range of about 6.0 to about 7.0. The long fibers may be the end product of slow, heat-agitated anaerobic digestion of manure. Combined with the fibers are substratum such as pine bark composted for a duration in the range of between about 9 months and about 12 months.

14 Claims, 2 Drawing Sheets

| | Nutrient Summary | | | | |
|---|---|---|---|---|---|
| | Amount Per Cubic Yard | | Amount per Ton, As Rec'd | | |
| Test | Total | Available | Total | Available | Available as a % of Total |
| Nitrogen | 4.5 lbs | 0.2 lbs | 19.09 lbs | 0.85 lbs | 4 |
| Phosphorus (P) | 0.72 lbs | 0.15 lbs | 3.06 lbs | 0.63 lbs | 21 |
| Phosphorus (P2O5) | 1.65 lbs | 0.34 lbs | 7.02 lbs | 1.45 lbs | 21 |
| Potassium (K) | 1.75 lbs | 1.16 lbs | 7.41 | 4.9 lbs | 66 |
| Potassium (K2O) | 2.11 lbs | 1.4 lbs | 8.97 lbs | 5.94 lbs | 66 |
| Calcium | 4.56 lbs | 1.47 lbs | 19.34 lbs | 6.25 lbs | 32 |
| Magnesium | 1.26 lbs | 0.58 lbs | 5.36 lbs | 2.46 lbs | 46 |
| Sulfur | 1.21 lbs | 0.27 lbs | 5.12 lbs | 1.13 lbs | 22 |
| Copper | 0.17 oz | 0.04 ozs | 0.7 ozs | 0.18 ozs | 26 |
| Zinc | 0.56 oz | 0.19 ozs | 2.37 ozs | 0.79 ozs | 33 |
| Manganese | 1.12 oz | 0.43 ozs | 4.74 ozs | 1.81ozs | 38 |
| Iron | 21.98 oz | 0.41 ozs | 93.25 ozs | 1.73 ozs | 2 |
| Boron | 0.24 oz | 0.04 ozs | 1 ozs | 0.15 ozs | 15 |
| Organic Matter | 222 lbs | | 943 lbs | | |

FIG. 1

NUTRIENT COMPARISON OF PREMIUM POTTING SOILS

| Product (Guaranteed Analysis from labels) | N | P | K |
|---|---|---|---|
| Scotts Premium Potting Soil | 0.07% | 0.01% | 0.03% |
| Black Gold All Purpose Potting Soil | 0.13% | .04% | 0.13% |
| Happy Frog All Purpose Potting Mix | 0.05% | 0.05% | 0.05% |
| Miracle-Gro Organic Choice Potting Soil | 0.10% | 0.05% | 0.05% |
| Vigoro All Purpose Potting Soil | 0.07% | 0.04% | ).03% |
| Nature's Care Organic Potting Soil | 0.18% | 0.10% | 0.12% |
| Black Gold Organic Potting Soil | 0.05% | N/A | N/A |
| Vigoro Organic Potting Soil | 0.10% | 0.05% | 0.05% |
| Scotts Moisture Control Potting Soil | 0.21% | 0.11% | 0.16% |
| Magic Dirt™ Organic Potting Soil | 1.15% | 0.30% | 0.35% |

FIG 2

Nutrient Summary

| Test | Amount Per Cubic Yard | | Amount per Ton, As Rec'd | | Available as a % of Total |
|---|---|---|---|---|---|
| | Total | Available | Total | Available | |
| Nitrogen | 4.5 lbs | 0.2 lbs | 19.09 lbs | 0.85 lbs | 4 |
| Phosphorus (P) | 0.72 lbs | 0.15 lbs | 3.06 lbs | 0.63 lbs | 21 |
| Phosphorus (P2O5) | 1.65 lbs | 0.34 lbs | 7.02 lbs | 1.45 lbs | 21 |
| Potassium (K) | 1.75 lbs | 1.16 lbs | 7.41 | 4.9 lbs | 66 |
| Potassium (K2O) | 2.11 lbs | 1.4 lbs | 8.97 lbs | 5.94 lbs | 66 |
| Calcium | 4.56 lbs | 1.47 lbs | 19.34 lbs | 6.25 lbs | 32 |
| Magnesium | 1.26 lbs | 0.58 lbs | 5.36 lbs | 2.46 lbs | 46 |
| Sulfur | 1.21 lbs | 0.27 lbs | 5.12 lbs | 1.13 lbs | 22 |
| Copper | 0.17 oz | 0.04 ozs | 0.7 ozs | 0.18 ozs | 26 |
| Zinc | 0.56 oz | 0.19 ozs | 2.37 ozs | 0.79 ozs | 33 |
| Manganese | 1.12 oz | 0.43 ozs | 4.74 ozs | 1.81 ozs | 38 |
| Iron | 21.98 oz | 0.41 ozs | 93.25 ozs | 1.73 ozs | 2 |
| Boron | 0.24 oz | 0.04 ozs | 1 ozs | 0.15 ozs | 15 |
| Organic Matter | 222 lbs | | 943 lbs | | |

PLANT NUTRIENT COMPOSITION

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

The invention disclosed herein generally relates to plant nutrient compositions. More particularly, the present invention relates to a combination of fibrous matter mixed with acidic matter to comprise a nutrient rich substratum facilitating plant growth. Even more specifically, the invention disclosed herein includes (comprises) fibers obtained from anaerobically digesting organic waste such as manure, combined with organic material such as pine bark.

(2) Background of the Invention

Nutrient-filled soil amendments, also known as potting soil in some contexts, are not mere combinations of fertilizers and filler material. Fertilizers typically are classified and gauged by their relative amounts and ratios of known growth-enhancing elements and compounds such as nitrogen, phosphorus and potassium. Soil amendments strive to achieve a particular balance between those elements and other materials and characteristics that may enhance plant growth under particular conditions. Other characteristics to be considered under particular circumstances may include the physical and chemical characteristics of the native soil of the ecosystem being treated, and the characteristics of additives that may be applied along with known growth-enhancing elements. Besides the nutrient component, soil amendments often strive to address characteristics such as soil porosity, acidity (pH) and water retention capability.

There are many fertilizers and soil amendments known in the field. Although most have similar complements of the basic nutrients, there is variation in the amounts and ratios of both basic and not-so-basic nutrients, and other elements such as those that affect the ability of the soil to retain moisture and nurture plant growth. FIG. 1 is a listing of nine of the leading premium potting soils.

Peat moss has been the traditional substratum for soil amendments. However, peat moss has become more expensive, its harvesting is not ecological, and it has extremely slow regenerative capabilities (up to 20 years to regenerate a peat moss bog after harvesting). Accordingly, a substitute substratum has been sought for a number of years.

Within the last decade or so, processed animal waste, primarily cattle and chicken manure, was considered as a possible source of fertilizer and/or substitute substratum. Although some such processed waste has uses as fertilizer, its overuse as such has resulted in eutrophication of ponds and water sources. Attempts were also made to use fibers obtained from digested manure as substitute substratum. One such digestion process was patented in U.S. Pat. No. 6,451,589 issued to Dvorak (the "589 patent"), for a method and apparatus for processing high-solids organic waste material such as cattle manure. (The invention disclosed herein uses fibers obtained from a digestion process that differs from the '589 patent process in a few important steps.) A company named GroMoor (no longer believed to be in business) attempted to use fibers obtained from the '589 patent process, as a soil amendment. A company named Organix also uses fibers obtained from the '589 patent process (or a process very similar thereto), as a soil amendment; it is believed that the only other processing involves adding citric acid to such fibers.

Also known in the field is a product produced by Miller Companies that was believed to be initially made from fiber similar to that component of the disclosed composition; however, that product was comprised of less than ten percent (10%) of such fiber (less than one-seventh ($1/7^{th}$ the amount of fiber used in the disclosed composition), while the remaining 90% of matter included Sphagnum peat moss, and perlite.

BRIEF SUMMARY OF THE INVENTION

In general, the invention disclosed herein includes (comprises) a combination composition for adding plant growth factors to soil, comprising a combination of long organic fibers comprising nitrogen, phosphorus and potassium available for plants, in combination with organic substratum providing pH neutralization. Said fibers may be the end product of slow, heat-agitated anaerobic digestion of manure. Combined with the fibers are substratum comprising pine bark composted for a duration in the range of between about 9 months and about 12 months.

The organic waste (mostly dairy manure) goes into the mixed plug flow anaerobic (without air/sealed) digester as a 12% solid solution. The other 88% is a combination of water and urine. While in the digester, the waste is kept at a constant 100 degrees and constantly agitated to speed up the digestion. When the waste exits the digester, the solids and liquids are separated. The solids (called digested fiber) make up one component of the disclosed composition.

The heat treatment kills all weed seeds in the waste (making the fiber distinguishable from compost). Also, the digested fiber is virtually pathogen free (another distinguishing difference from compost).

Ideally, the fiber is mixed with aged forest product or composition(s) having the same characteristics. Typically that includes pine bark that has been composted for 9-12 months, although other natural and manmade materials and compositions may be added so long as the functional requirements are met, including (for example) the establishment or balancing of the pH of the mixture. Although not always required, each "batch" of fiber is tested and, based on the test, the appropriate amount of pine bark is mixed with the fiber to yield the desired pH. Without the right amount of pine bark or similar material, the pH in the fiber would be too high, and it would kill plants. The recipe is typically about 75% fiber and 25% bark.

Ideally the resulting composition will have a pH in the range of between about 6.0 and about 7.0, depending upon the intended use of the mixture. The composition can be engineered for the range of between about 6.0 to 6.5, for use such as growing *Antirrhinum* or Snapdragon, Brassicaceae (broccoli, cabbage, candytuft, cauliflower, turnip, wallflower); Cucurbitaceae (cucumber, pumpkin, squash); Fabaceae (pea, red clover, white clover), Gladiolus; Iceland Poppy; Rosales; Cannabis; rose; strawberry; Solanaceae (eggplant, Aubergine, tomato); sweet corn; Violaceae (pansy, viola); *Zinnia* and Zinnea. The composition can be engineered for the range of between about 6.5 to 7.0, for use such as growing Amaranthaceae (beet, spinach); Apiaceae (celery, parsnip); Asparagales (asparagus, onion), Asteraceae (chrysanthemum, dahlia, lettuce), carnation, Fabaceae (alfalfa, sweet pea); melon, and tulip.

A principal object of the current disclosure is to provide a nutrient composition having the utmost amounts of growth enhancing nutrients.

Another object of the current disclosure is to provide a nutrient composition having high water retention capabilities, and high porosity.

Another object of the current disclosure is to provide a nutrient composition that is pathogen-free.

Yet another object of the current disclosure is to provide a nutrient composition qualifying as certified organic, that is environmentally friendly with sustainable ingredients.

BRIEF DESCRIPTION OF THE DRAWINGS

The novel features believed characteristic of the disclosed subject matter will be set forth in the claims. The disclosed subject matter itself, however, as well as a preferred mode of use, further objectives, and advantages thereof, will best be understood by reference to the following detailed description of an illustrative embodiment, when read in conjunction with the accompanying drawings.

FIG. 1 depicts a chart comparing the standard nitrogen-phosphorus-potassium content of nine leading premium potting soils, and the plant nutrient composition disclosed herein (known as Magic Dirt).

FIG. 2 summarizes the nutrients of typical batch of the disclosed composition, as determined by independent testing.

DETAILED DESCRIPTION OF ILLUSTRATIVE EMBODIMENTS

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprising", "including" or "having", and any derivative of any of those terms, when used in this specification, specify the presence of stated features, regions, integers, steps, operations, elements, and/or components, but do not preclude the presence or addition of one or more of the same.

In general, the invention disclosed herein includes (comprises) a combination composition for adding plant growth factors to soil, comprising a combination of long organic fibers comprising nitrogen, phosphorus and potassium available for plants, in combination with organic substratum providing pH balancing in the range of between about 6.0 to about 7.0. The fibers may be the end product of slow, heat-agitated anaerobic digestion of manure. Most of the fibers may have a length in the range of between about 2 inches to about 0.25 inch. A significant proportion of fibers have an average length of greater than 1 inch; this length is longer than the prior art, and it provides greater porosity and less compaction of the soil amendment. Most of the remainder have a length in the range of between about 1 inch and 0.25 inch; the higher lengths are longer than the prior art as well. The vast majority of fibers have a thickness in the range of between about $1/16^{th}$ inch to $1/32^{nd}$ inch, typically thinner than bedding straw but thicker than composted bedding material on the market. Any further processing such as barrel composting, barrel drying, or mechanical pressing will result in fibers of shorter length, which will result in a product having lower porosity.

The fibers may be the end product of slow, heat-agitated anaerobic digestion of manure, followed by screen separation and/or free-fall heated-air drying.

The combination composition includes substratum comprising pine bark, preferably composted for a duration in the range of between about 9 months and about 12 months.

Ideally, the combination composition includes about 1.15% nitrogen, about 0.30% phosphorus, and about 0.35% potassium (by dry weight). It also has water retention capability of between about 3.0 and 3.5 times its dry weight, preferably water retention capability of about 3 times its dry weight.

One preferred embodiment includes a combination composition for adding plant growth factors to soil, comprising a combination of:
 (a) long organic fibers having a nutrient content of about 1.15% nitrogen, about 0.30% phosphorus, and about 0.35% potassium by dry weight; in combination with
 (b) pine bark composted for a duration in the range of between about 9 months and about 12 months; and
 (c) said combination composition having a pH in the range of between about 7.0 and about 6.4 (6.7 being the preferred or target pH, plus or minus 0.3).

Unlike composted fibers, the digested fiber has a longer fiber length, which creates good air porosity. This gives the fiber a spongy quality with the ability to retain more than three times its weight in water for improved moisture control. Moreover, no weeds developed in tests. The fiber contains sufficient amounts of total nitrogen (N), available phosphate ($P_2O_5$) and soluble potash ($K_2O$) to promote good root development and plant growth. Importantly, the fibers are pathogen-free.

Unlike many other premium potting soils, the disclosed composition does not contain unsustainable ingredients such as peat moss, coir, vermiculite or perlite; neither does it release pollutants when harvested, as does peat moss harvesting. Similarly, the fiber of the disclosed composition can be produced within a month, whereas the average time for a peat moss bog to regenerate after harvesting is about 20 years. The disclosed composition is certified "organic", and certified "bio-based".

Tests have been performed on typical batches of the disclosed composition. In one independent testing of such a batch, measurements made at container capacity reflect conditions in a 6-inch soil column that had been saturated and allowed to drain to equilibrium. It was found that there was air space of 12.7%. Water retention was abundant at 58.4% media volume, equivalent to 3.5 times its dry weight. Particle size distribution analysis showed that 92% of particles passing a 0.25 inch screen; and only 31% of particles passed the through the 0.5 mm screen. The composition had a hydration index of 0.81. The saturated bulk density was 54.6 pounds per cubic foot (1475 pounds per cubic yard), which is toward the light end of the range usually specified for media proposed for on-structure use. The organic content was 75% by weight.

Chemical suitability characteristics showed a slightly acidic pH and, with lime absent, this is in the range preferred by most types of plants. Salinity and sodium levels were safely low, and the SAR value shows soluble sodium adequately balanced by calcium and magnesium. The majority of nitrogen available for plant uptake was in the preferred nitrate form. About 96% of the total nitrogen was organic, and there was a carbon-to-nitrogen ratio of 29.6, indicating that there was plentiful nitrogen to compensate for further organic decomposition.

Available iron was fair, and all of the other required nutrients were well supplied. Particularly abundant were phosphorus, potassium, magnesium, sulfate, zinc and manganese. FIG. 1 is a chart comparing the standard nitrogen-phosphorus-potassium content of 9 leading premium potting soils, and the plant nutrient composition disclosed herein. FIG. 2 summarizes the nutrients of the tested batch.

Besides the soil amendment combination composition described herein, the invention includes the method of making the fibers and combining them with the bark. The process for making the fibers is a variant of the process disclosed in U.S. Pat. No. 6,451,589 issued to Dvorak (the "589 patent") for a method and apparatus for processing high-solids organic waste material such as cattle manure. Total process flows of waste materials are controlled in substantially-closed systems, and subjected to a lengthy process involving relatively slow agitation and movement of waste along a long enclosed digester under continuous heat. A digester for processing high-solids waste is provided comprising a mixing chamber, a clarifier, and a generally U-shaped digester. There is a mixing chamber located adjacent a heated digester chamber, where thermal agitation of the waste causes controlled mixing of wastes in the digester.

In operation of the waste-processing system, unprocessed cow manure is transferred to the mixing chamber, where the manure is mixed with activated sludge (essentially the liquid fraction saved from the previous digestion/processing of manure). That sludge-like mixture is heated to approximately 105 to 130 degrees Fahrenheit. (Heavy solids such as grit fall to the bottom of the mixing chamber under the influence of gravity and are removed using an auger in the bottom of the mixing chamber, and transferred to a disposal site.) After a stay of approximately one day in the mixing chamber, the sludge flows through an opening in the wall separating the mixing chamber and the digester, where anaerobic digestion takes place. The activated sludge added to the manure in the mixing chamber serves to start the anaerobic digestion process.

The digester is essentially a long enclosed chamber having a center wall running most of the length of the chamber, thereby forming a U-shape digestion pathway; the digester has a long sludge flow path, and thus a long residence time of approximately twenty days. As the sludge flows through the digester, anaerobic digestion processes the manure sludge into activated sludge.

From the digester, the activated sludge flows into a clarifier chamber. The clarifier uses gravity to separate the activated sludge into liquid and solid portions. Under the influence of gravity and separation panels, the liquid portion rises to the top of the mixture and is decanted away. The solid portion of the activated sludge settles to the bottom of the clarifier. Sometimes the solids are subjected to mechanical press processing to reduce the moisture content; such processing is not recommended for the disclosed composition, because that will reduce the length of fibers unnecessarily. Unlike the '589 patent and other known prior art, most of the activated sludge is removed from the clarifier and is processed through a screen separator; at this point, the moisture content is reduced to between about sixty-five to seventy percent.

The fibers of the present invention have a second processing step not disclosed in the '589 patent, namely, an additional step of heat drying the fibers while they are free-falling. The fibers of the present invention are transported to approximately 15 to 20 feet above the ground level, then pumped out into the air and through an airstream having a temperature of approximately 100 degrees Fahrenheit. This aerates and separates the fibers, and causes them to dry as they descend. It also provides the fibers with a more airy, fluffy consistency, which allows further drying after free-fall drying. Although the fibers may have a variety of lengths, typically they are in the range of between about 1.5 inch and about 0.25 inch long; a significant portion have a length of over 1 inch. This is relatively long for materials used for soil amendments.

Moreover, unlike the '589 patent, the fibers of the present invention do not undergo any further composting (and consequent aerobic digestion), nor are they subjected to any mechanical press.

Pine bark is mixed with dried fibers. Ideally, the pine bark is "rough ground", resulting in particles having a maximum dimension in the range of between about 0.25 inch and 0.5 mm. Ideally, the particles will be toward the higher end of said range, to reduce compacting.

Before such mixing, the fibers generally have a pH in the range of between about 7.9 and 9.2. Relatively fresh pine bark typically has a pH of between about 3.4 and 4.5; after composting (aging) for 9 to 12 months, pine bark has a pH of about 3.0 and 4.0. During the composting period, it is believed that nitrogen-eating microbes in the bark die, so that they do not consume the nitrogen in the fiber that is being made available to plants. Ideally, the pH of the soil amendment composition disclosed herein will be in the range of between about 6.0 and 7.0; and allowing the pine bark to age will increase its acidity, so that less will be needed to lower the pH of the combination composition to the desired target.

After drying, the fibers are preferably mixed with pine bark, preferably aged pine bark, to yield a composition having the desired pH, preferably about 6.7. At this time, it is ready to function as a premium potting soil. It has achieved the status of certified "organic" from the Organics Materials Review Institute, and been certified 100% bio-based under the U.S. Department of Agriculture's Bio-Preferred Program.

The fiber, after being processed in the anaerobic digester, has several interesting characteristics:

1. The long fiber creates beneficial porosity, emulating peat moss. One primary advantage of having the length of the fibers of the disclosed invention is that it creates good porosity; the longer the length, the greater the porosity. The greater the porosity, the looser the soil, and the better for root growth.

2. The fiber and bark combination will hold at least three times its dry weight in moisture, reducing the need to water so much. Another advantage is that it reduces the need to apply multiple different products to accomplish the same results.

3. The mixture has a lot more naturally occurring nutrients than any other premium potting soil (organic or non-organic), eliminating the need for chemical additives. See FIG. 1.

The disclosed combination composition is suitable for growing seeds in pots, transplanting seedlings, use in container gardens and hanging baskets, or to mix with outdoor soil to keep the soil loose and moist while adding additional naturally occurring nutrients for vigorous plant growth.

We claim:

1. A combination composition for adding plant growth factors to soil, comprising a combination of organic fibers longer than one-half inch and comprising nitrogen, phosphorus and potassium available for plants, in combination with organic substratum providing pH balancing in the range of between about 6.0 and 7.0.

2. A combination composition described in claim 1, said fibers comprising the end product of heat-agitated anaerobic digestion of manure for between nineteen and 21 days.

3. A combination composition described in claim 1, a substantial portion of said fibers having a length of greater than about 1 inch.

4. A combination composition described in claim 1, said substratum comprising pine bark.

5. A combination composition described in claim 1, said substratum comprising pine bark composted for a duration in the range of between about 9 months and about 12 months.

6. A combination composition described in claim 2, said fibers comprising the end product of heat-agitated anaerobic digestion of manure, followed by collection by screen filtering for between nineteen and 21 days.

7. A combination composition described in claim 6, followed by free-fall heated-air drying.

8. A combination composition described in claim 1, comprising about 1.15% nitrogen, about 0.30% phosphorus, and about 0.35% potassium (by weight).

9. A combination composition described in claim 1, having water retention capability of between about 3.0 and 3.5 times its dry weight.

10. A combination composition described in claim 1, said fibers consisting of natural organic fibers and said substratum consisting of natural organic substratum.

11. A combination composition for adding plant growth factors to soil, comprising a combination of natural organic fibers longer than one-half inch and, a substantial portion of said fibers having a length of greater than about 1 inch, in combination with pine bark, said combination composition having a pH in the range of between about 6.0 and about 7.0.

12. A combination composition described in claim 11, said fibers comprising the end product of heat-agitated anaerobic digestion of manure for between nineteen and 21 days, followed by collection by screen filtering, followed by free-fall heated-air drying.

13. A combination composition described in claim 12, comprising a nutrient content of about 1.15% nitrogen, about 0.30% phosphorus, and about 0.35% potassium (by dry weight).

14. A combination composition described in claim 12, said bark composted for a duration in the range of between about 9 months and about 12 months.

\* \* \* \* \*